United States Patent
Banctel et al.

(10) Patent No.: US 6,618,765 B1
(45) Date of Patent: Sep. 9, 2003

(54) METHOD OF MODIFYING A PROTOCOL BETWEEN DISTRIBUTED OBJECTS

(75) Inventors: Fabrice Banctel, Gif-sur-Yvette (FR); Armel Pietre, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/550,295

(22) Filed: Apr. 14, 2000

(30) Foreign Application Priority Data

Apr. 15, 1999 (FR) .............................................. 99 04713

(51) Int. Cl.$^7$ ................................................ G06F 9/44
(52) U.S. Cl. ...................................................... 709/315
(58) Field of Search ............................... 709/315, 316, 709/318, 310

(56) References Cited

U.S. PATENT DOCUMENTS

| | | | | |
|---|---|---|---|---|
| 5,485,617 A | * | 1/1996 | Stutz et al. ................. | 709/315 |
| 5,517,645 A | * | 5/1996 | Stutz et al. ................. | 709/316 |
| 5,613,148 A | * | 3/1997 | Bezviner et al. ............ | 709/203 |
| 5,787,251 A | | 7/1998 | Hamilton et al. | |
| 5,802,367 A | * | 9/1998 | Held et al. .................. | 709/332 |
| 5,822,585 A | * | 10/1998 | Noble et al. ................. | 709/316 |
| 5,956,509 A | * | 9/1999 | Kevner ....................... | 709/330 |
| 5,999,986 A | * | 12/1999 | McCauley, III et al. ..... | 709/310 |
| 6,006,230 A | * | 12/1999 | Ludwig et al. .............. | 707/10 |
| 6,347,342 B1 | * | 2/2002 | Marcos et al. .............. | 709/315 |
| 6,425,017 B1 | * | 7/2002 | Dievendorff et al. ....... | 709/315 |

FOREIGN PATENT DOCUMENTS

EP 0 651 328 A1 5/1995

OTHER PUBLICATIONS

Microsoft. "Windows DCOM Architecture White Paper." 1998.*
Randone, Carlo. "COM: Handle Late–bound Events within Visual Basic Using an ATL Bridge." Mar. 2001.*
Microsoft Corporation. "Marshaling Code for Connection Point Interfaces." Dec. 11, 1996.*
Microsoft Corporation. "Cariplo: Distributed Component Object Model." 1996.*
Wang et al. "Comera: COM Extensible Remoting Architecture." USENIX. Apr. 27–30,1998.*
Brockschmidt, Kraig. "OLE". Dr. Dobbs Journal. 1994.*
MSDN. "Dr. Gui and COM Events, Part. 2." Oct. 25, 1999.*
"DCOM Technical Overview", Microsoft Corporation, Nov. 1996.
"DCOM Architecture", by Markus Horstmann and Mary Kirtland, Jul. 23, 1997.

* cited by examiner

Primary Examiner—John Follansbee
Assistant Examiner—Lewis A. Bullock, Jr.
(74) Attorney, Agent, or Firm—Sughrue Mion, PLLC

(57) ABSTRACT

A method of implementing a personalized call-back protocol between an object X of a client process and an object S of a server process in an environment based on an ORB distributed object manager allocates a connection point CP3 of the server object S to a client object X of a call-back service offered by the server object. The connection point includes a marshaling interface IMarshal for implementing an object-object protocol between the client object X and the connection point CP3 by means of a personalized pair of representative elements of the connection point and that personalized pair enables implementation of the particular call-back protocol.

7 Claims, 2 Drawing Sheets

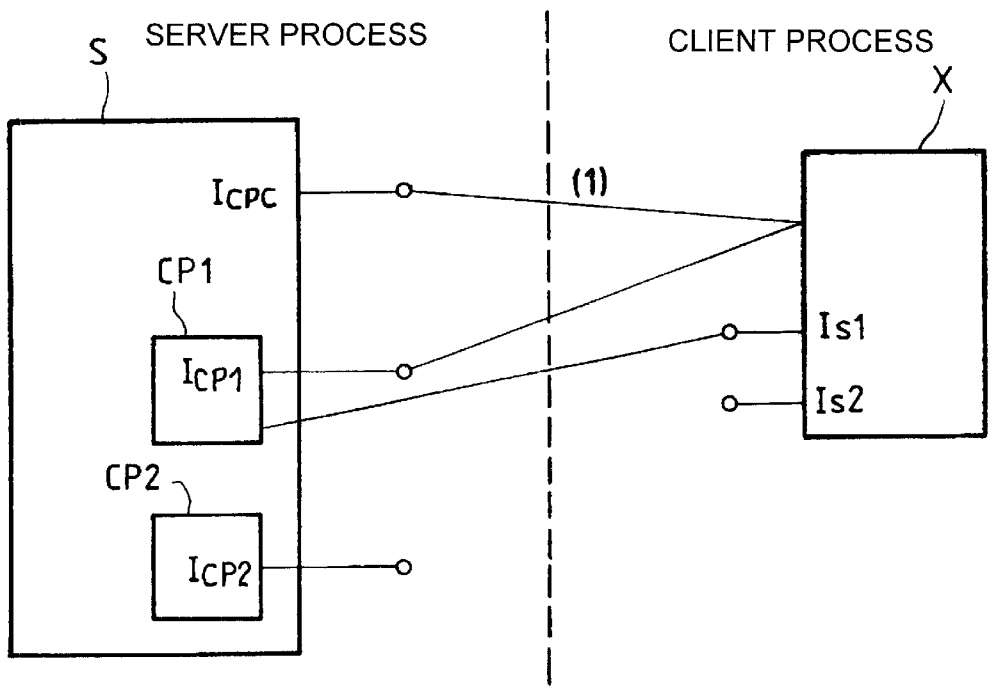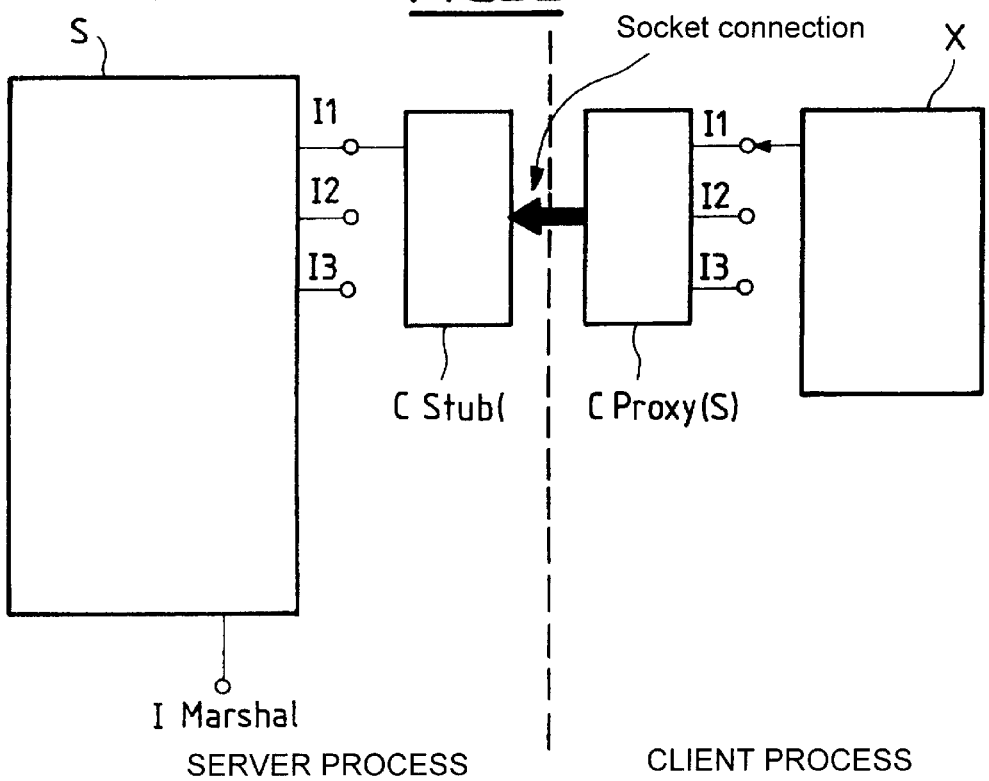

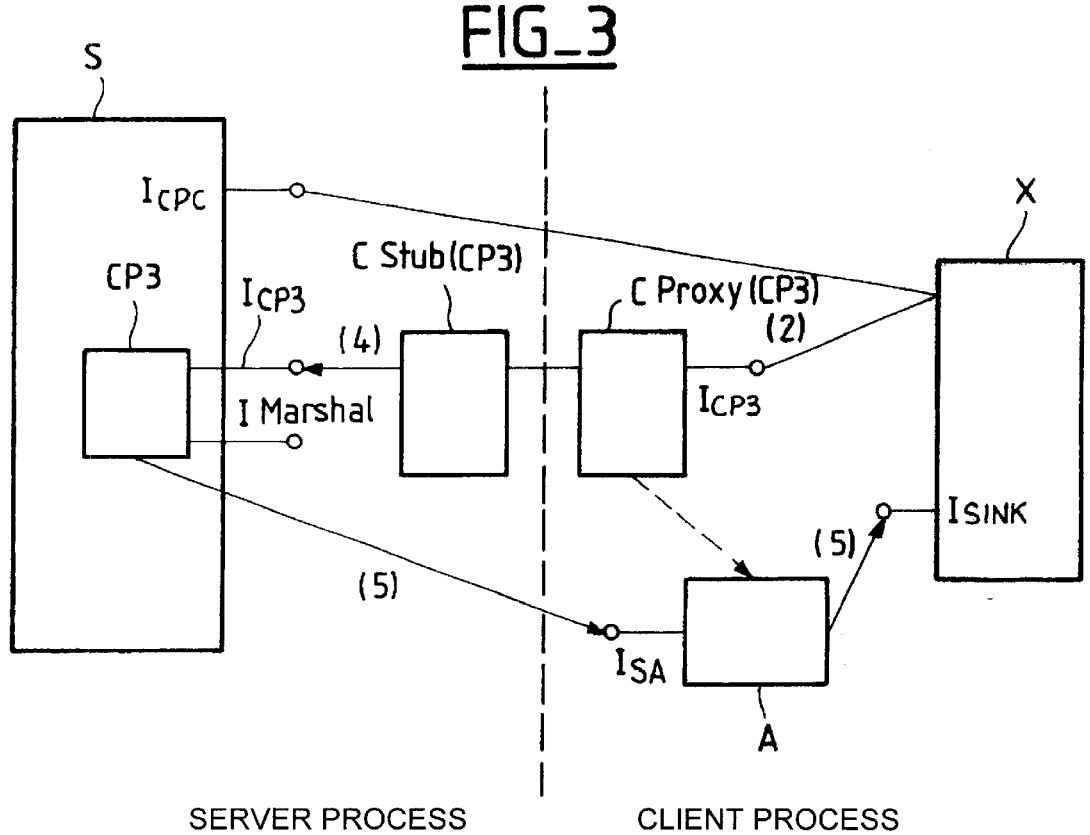
FIG_3
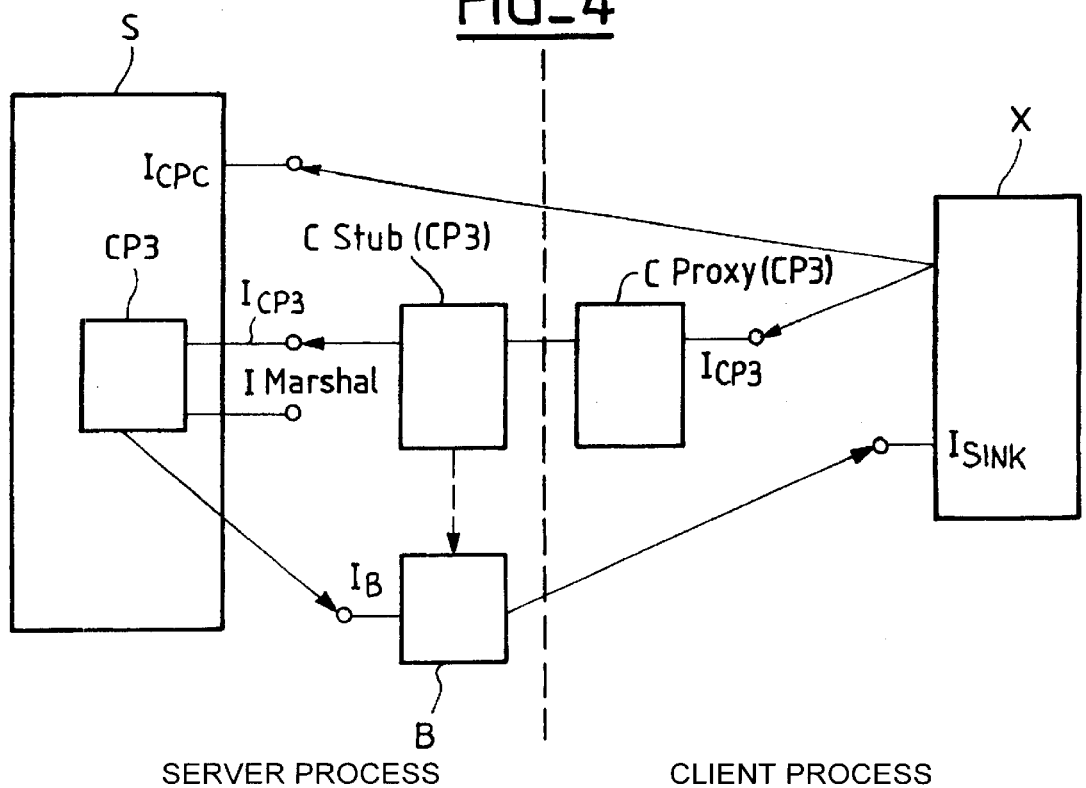
FIG_4

METHOD OF MODIFYING A PROTOCOL BETWEEN DISTRIBUTED OBJECTS

The present invention concerns a method of modifying a protocol between distributed objects in an environment based on an ORB (Object Request Broker) distributed object manager. One prior art ORB is the DCOM (Distributed Component Object Model) ORB.

BACKGROUND OF THE INVENTION

Many applications use an environment of the above kind. Examples are telecommunications or transport supervisory applications, applications constituting an intelligent network, etc.

In a distributed object environment, an application can use different servers to provide services to clients.

A client process is a program which uses services and a server process is a program which provides services to clients.

An object of the client process (a process which therefore corresponds to an instance of execution of a program) can solicit a service of the server by sending it a corresponding message. A corresponding object of the server executes the service and, if necessary, sends a response back to the client process object.

The invention addresses more particularly the transmission to the client object of notifications referred as call-backs. These are messages sent by a server object to a client object at the initiative of the server object when the client object has subscribed to a call-back service. A typical example of the use of a call-back service of this kind relates to supervisory applications in which clients wish to be informed of changes of properties of objects.

To subscribe to a server object service of this kind, a client object usually solicits an "advise" method of the server object. This method provides for the specification of parameters, in particular input parameters to enable the server object to call the client back when it has call-backs to send.

In practice, various protocols can be used to establish the call-back communications protocol.

In the particular case of a DCOM ORB, a simple mechanism can be used whereby, to enable the server object to call it back to send it a call-back, the client object, which has one or more input interfaces, supplies an input parameter to the server object at a subscription interface specific to that object and in the form of a pointer to one of its interfaces.

Another available mechanism is the connection points mechanism.

An ORB such as the DCOM ORB offers a standard mechanism referred to as the connectable objects mechanism to enable a client object to subscribe to a server object. In that mechanism, which is shown diagrammatically in FIG. 1, the server object which sends the call-backs, referred to as the connectable object, can support a connection point container interface.

In the example shown, the connectable server object S has a connection point container interface ICPC. Any client can request a particular connection point via this ICPC input interface.

In the example shown, a client object X has an input interface IS1 and an input interface IS2. It can send to the connection point container interface ICPC of the server object S a request (1) for allocation of a connection point for a given protocol associated with its input interface IS1. If the server object S supports the given protocol, it creates a corresponding connection point object CP1. The connection point CP1 has a connection point interface ICP1. The client object can then subscribe to the service by soliciting (2) the advise method of this interface ICP1 of the connection point CP1. Thereafter, the connection point CP1 sends (3) call-backs to the corresponding input interface IS1 of the client object.

If it wishes to receive call-backs in a different protocol at its other input interface IS2, the client object can submit a connection point allocation request to the server object in respect of that protocol. The server object then creates a new connection point object CP2, if appropriate.

As shown in FIG. 1, the connectable object S and the connection points CP1, CP2 are in practice often in the same object, in other words in the same class of the C++ language, even if their interfaces are separate.

Another available mechanism is that referred to as the custom marshaling mechanism. The skilled person is familiar with this marshaling mechanism in the particular context of the DCOM ORB. As shown diagrammatically in FIG. 2, the mechanism replaces a pair of standard representative elements of the object-object protocol used by the client object to subscribe to the server object, with a pair of personalized representative elements enabling use of a specific personalized communications protocol, such as the sockets shown in FIG. 2.

In the well-known object-object protocol, when an object of a client process sends a message to a given object of a server process, the message passes through a pair of representative elements of the server object. This pair manages the corresponding interprocess calls in a manner which is transparent for the two remote objects, namely the client object and the server object. The pair includes a Proxy representative element of the server object in the client process and a corresponding Stub representative element in the server process.

The advantage of an object protocol of the above kind is that the objects do not need to know where the objects with which they exchange messages are located. With this protocol, the ORB conceals the location of the objects, as it were, which considerably simplifies access to the objects wherever they are located.

The Proxy element of the pair of representative elements includes all the interfaces of the server object.

The standard pairs of Proxy/Stub representative elements of these interfaces may not suit the client object, for example because they are not efficient enough.

The marshaling mechanism proposed by the ORB enables the use of a different interface.

The objects which enable the use of a mechanism of the above kind include a marshaling interface denoted IMarshal.

Accordingly, when the ORB detects that a new pair of Proxy elements is to be created for sending messages between two remote objects, it asks the message destination object if it supports a marshaling interface. If it does not support a marshaling interface, the ORB creates the standard pair of representative elements. If it does support a marshaling interface, the ORB creates a personalized pair of representative elements corresponding to the class of object specified by the destination object.

The personalized pair of representative elements completely replaces the standard pair of representative elements. In other words, it includes all the interfaces that the standard pair would include.

FIG. 2 is a simplified diagram showing the application of a mechanism of the above kind. The server object S has a marshaling interface IMarshal which enables the ORB to create a personalized pair of representative elements. The client object X sends its messages to the server S via this personalized pair, which is formed of a personalized proxy representative element CProxy(S) and a personalized Stub representative element CStub(S).

The two representative elements are personalized in the sense that they use a personalized interobject communications protocol corresponding to their class.

For example, a mechanism of the above kind is used in practice to implement a socket type communications protocol at the level of the personalized pair, for example with network connection if the two objects are on different machines or with shared memory if the two objects are on the same machine. This is symbolized in FIG. 2 by the arrow indicating a socket connection.

The above mechanism has been applied in the prior art to implementing a cache. For example, the first time that the client object asks the name of the server object, the personalized Proxy element finds it and then retains it. Accordingly, it can subsequently supply the name directly, without sending any call to the server object.

The invention addresses the possibility of modifying protocols for the call-back service. The need to modify call-back protocols can become apparent during development or use of an application system, in particular for call optimization reasons. For example, it may prove necessary to group call-backs sent by different server objects in order to send only one header for all the messages. The need for optimization may become apparent when the application has already been implemented. It must be possible to change the communications protocol without changing the interfaces of the objects.

In the case of the mechanism using the dedicated subscription interface, changing the protocol entails rewriting the code corresponding to that interface in the server object. This requires recompilation of the server object. The connection point mechanism has the same drawback, since in practice the connection points are in reality in the server object itself. It is therefore necessary to recompile the server object to change the connection point. What is more, the corresponding development tools in practice make it difficult to change the implemartation of a connection point. This modification problem becomes very serious if the protocol concerned is generic, i.e. if it concerns many objects in the application.

In the case of the marshaling mechanism, only the personalized pair must be changed, with no need to recompile the server object, because both elements of the pair are objects separate from the server object.

In contrast, to write the personalized pair, it is necessary to know all the interfaces supported by the server object. In the example shown in FIG. 2, the personalized pair must include the three interfaces I1, I2, I3 of the server object (not the marshaling interface used by the ORB to implement the marshaling mechanism). A personalized pair cannot be used for a single interface. This is a serious problem if the protocol which changes is sufficiently generic to concern many objects with different interfaces.

OBJECT AND SUMMARY OF THE INVENTION

The object of the present invention is to provide a method of modifying a protocol which does not have the drawbacks referred to above.

The protocol modification method of the invention is based on the use of the connection point mechanism in combination with the marshaling mechanism. This solution is based on the fact that a connection point is a COM object like any other, even if its position in the server object confers a somewhat different status on it. The marshaling mechanism can therefore be applied to it just as it can be applied to any COM object. The connection point has only one input interface: the connection point interface. The personalized pairs of representative elements which enable the marshaling mechanism to be used therefore include only this connection point input interface. Thus application of the connection point mechanism eliminates the drawbacks of the marshaling mechanism. The problem of using development tools to modify the connection points is less serious because the modification is not tied to the modification of a protocol in itself: the modification modifies the protocol by way of the personalized pairs. In other words, all connection points are modified in the same way to enable the marshaling mechanism to be applied to them.

The invention therefore modifies the connection points by adding to them a marshaling interface enabling use of the marshaling mechanism at the connection point concerned.

The invention provides a method of modifying a call-back protocol between an object of a client process and an object of a server process in an environment based on an ORB distributed object manager, wherein the method allocates a connection point of the server object to a client object of a call-back service offered by the server object, said connection point includes a marshaling interface for implementing an object-object protocol between the client object and said connection point by means of a personalized pair of representative elements of the connection point and said personalized pair enables implementation of said personalized call-back protocol.

BRIEF DESCRIPTION OF THE DRAWINGS

Other features and advantages of the invention are explained in the following description which is given by way of non-limiting example only and with reference to the accompanying drawings, in which:

FIG. 1 is a diagram showing a call-back protocol using a prior art connection point mechanism, FIG. 2 is a diagram showing a call-back protocol using a prior art marshaling mechanism, FIG. 3 is a diagram showing a call-back communications process constituting a first embodiment of the invention, and FIG. 4 is a diagram showing a call-back communications process constituting a second embodiment of the invention.

MORE DETAILED DESCRIPTION

FIG. 3 shows an application of the invention, corresponding to a situation in which a new mechanism is introduced at the first Proxy representative element end.

In the client process there is a client object X with an input interface ISINK.

In the server process there is a server object S with a connection point container interface ICPC.

The client object X sends (1) a connection point allocation request to the corresponding interface ICPC of the server object S.

The latter then creates a corresponding connection point object point CP3 which, in accordance with the invention, includes not only a connection point interface ICP3 but also a marshaling interface IMarshal.

The client object can then send (2) an advise request with a parameter in the form of a pointer to its input interface IA. The ORB which detects the requirement for communication between the object X and the connection point object CP3 asks the connection point object if it supports a marshaling interface and, as this is the case in the method of the invention, enables the creation of a personalized pair of representative elements CProxy(CP3) and CStub(CP3).

The modification of the protocol holds in the personalized pair of representative elements created. Those representative elements being objects, independent of the others, to modify the protocol it is clearly in fact necessary only to modify these objects (PROXY and STUB). This greatly simplifies the modification process. If the protocol in question is generic, the modification need be done only once. As the objects are connection point representative elements, there is only one input interface, the connection point interface. The marshaling interface relates only to the connection point object, not the representative elements. Thus what was previously a disadvantage in the marshaling mechanism applied to any COM object that might include multiple interfaces becomes an advantage when applied to a connection point object.

FIG. 3 shows an example of modification of the communications protocol whereby all call-backs sent via the connection point CP3 are required to pass through an object A at the Proxy representative element end, i.e. in the client process.

In this case, when it receives (2) the advise message, the personalized proxy CProxy(CP) replaces the parameter (pointer) identifying the interface ISINK of the client X with a parameter identifying the input interface IA of the object A and sends (3) the modified message to the representative element CStub(CP3), which sends (4) the message to the connection point interface ICP3 of the connection point object CP3 to solicit the corresponding method at the server object.

Then, when a call-back is sent by the server object via the connection point object CP3, that call-back is sent to the object A of the new protocol, which can process the call-back and send it to the final client object.

To this end, note that the element CProxy(CP3) sends the object A a message to inform it of the advise message that it has received from the object X and to supply it with the corresponding parameters, including the parameter identifying its input interface ISINK.

This type of application of the method of the invention is beneficial when it is advantageous to process the call-backs at the client process end.

FIG. 4 shows an application of the protocol modification method when the modification is made at the server process end.

In this case, when it receives (2) the advise message, the personalized proxy CProxy(CP) sends it (3) to the representative element CStub(CP3). The latter replaces the parameter (pointer) identifying the interface ISINK of the client object X with a parameter identifying the input interface IB of the object B and sends (4) the modified message to the connection point interface ICP3 of the connection point object CP3 to solicit the corresponding method of the server object.

Then a call-back is sent by the server object via the connection point object CP3 is sent to the object B of the new protocol, which can process it and send it to the final client object.

To this end, note that the element CStub(CP3) sends a message to the object B to inform it of the advise message that it has received from the object X and to supply it with the corresponding parameters, including the parameter identifying the input interface ISINK of that client object.

This particular example of application of the invention modifies the protocol at the server process end to group call-backs to be sent to a client object in order to reduce the number of interprocess calls.

Note that the two examples can be combined, with an object A in the client process and an object B in the server process.

Note also that the objects A and B are merely examples corresponding to the modification of the protocol. The protocol can be modified in highly diverse ways. Modification of a protocol can be entirely supported by the personalized pair of representative elements, without creating other objects such as objects A and B.

The skilled person can therefore use the invention in various ways to modify a protocol in an application. In all cases, the connection points must be modified to add to them the marshaling interface according to the invention, using available development tools in an appropriate manner.

The necessary personalized Proxy/Stub pairs can then be rewritten to implement the modified protocol.

The modification of the protocol is then transparent for the server and client objects.

What is claimed is:

1. A method of implementing a personalized call-back protocol between an object of a client process and an object of a server process in an environment based on an ORB distributed object manager, wherein the method allocates a connection point of the server object to a client object of a call-back service offered by the server object, said connection point includes a marshaling interface for implementing an object-object protocol between the client object and said connection point by means of a personalized pair of representative elements of the connection point and said personalized pair enables implementation of said personalized call-back protocol.

2. A method according to claim 1, wherein said personalized pair is such that call-backs sent by said connection point are received by a particular object which processes them in order to send them to the destination client object.

3. A method according to claim 2, wherein said particular object is an object of the client process.

4. A method according to claim 3, wherein, if said personalized pair receives a message from the client object it substitutes for a parameter identifying an interface of the client object a parameter identifying an interface of said particular object before sending the modified message to said connection point.

5. A method according to claim 4, wherein said pair also sends a parameter identifying the interface of the client object to said particular object.

6. A method according to claim 2, wherein said particular object is an object of the server process.

7. A method according to claim 1, the method being applied to an environment based on a DCOM ORB.

* * * * *